US012339061B2

(12) United States Patent
Ghelli et al.

(10) Patent No.: US 12,339,061 B2
(45) Date of Patent: Jun. 24, 2025

(54) PLANT FOR TREATING GAS, PARTICULARLY NATURAL GAS, SUPPLIED BY A TRANSMISSION NETWORK

(71) Applicant: GRUPPO SOCIETA' GAS RIMINI S.p.A., Rimini (IT)

(72) Inventors: Gianluca Ghelli, Zola Predosa (IT); Alessandro Bugli, Rimini (IT)

(73) Assignee: GRUPPO SOCIETA' GAS RIMINI S.p.A., Rimini (IT)

( * ) Notice: Subject to any disclaimer, the term of this patent is extended or adjusted under 35 U.S.C. 154(b) by 398 days.

(21) Appl. No.: 17/961,808

(22) Filed: Oct. 7, 2022

(65) Prior Publication Data

US 2023/0119458 A1 Apr. 20, 2023

(30) Foreign Application Priority Data

Oct. 20, 2021 (IT) ........................ 102021000026921

(51) Int. Cl.
*F25J 1/00* (2006.01)
*F17D 1/04* (2006.01)
*F25J 1/02* (2006.01)

(52) U.S. Cl.
CPC .............. *F25J 1/0232* (2013.01); *F17D 1/04* (2013.01); *F25J 1/0022* (2013.01); *F25J 1/004* (2013.01);
(Continued)

(58) Field of Classification Search
CPC .......... F25J 1/001; F25J 1/0279; F25J 1/0208; F25J 1/0204; F25J 1/0209
See application file for complete search history.

(56) References Cited

U.S. PATENT DOCUMENTS 4,778,497 A * 10/1988 Hanson .................. F25J 1/0007 62/613
2010/0186445 A1* 7/2010 Minta ...................... F25J 1/004 62/606
2016/0003528 A1 1/2016 Pages et al.

FOREIGN PATENT DOCUMENTS

EP 3839321 A1 6/2021
RU 2671665 C1 * 11/2018
RU 2691876 C1 6/2019

OTHER PUBLICATIONS

Italian Search Report issued Jun. 7, 2022 in connection with IT appication No. 102021000026921 from the Italian Patent Office.

* cited by examiner

*Primary Examiner* — Brian M King
(74) *Attorney, Agent, or Firm* — Christopher M. Scherer; DeWitt LLP

(57) ABSTRACT

The present application includes a plant for treating gas, particularly natural gas, supplied by a transmission network. The plant includes a gas inlet connected to the transmission network, a portion of the plant that decompresses, to a predefined outlet pressure, a first fraction of the gas from the inlet, and supplies the decompressed gas at a first outlet. The plant also includes another portion that liquifies a second fraction of the gas from the inlet and supplies the liquefied gas at a second outlet. The portion that carries out the decompressing includes a valve for throttling the first gas fraction, a heat exchanger establishing a thermal exchange relationship between the decompressing portion placed downstream the throttle valve and the portion that liquifies and supplies the gas, another heat exchanger establishing a thermal exchange relationship between the plant portions placed downstream the first heat exchanger and upstream the throttle valve. The portion that liquifies and supplies also
(Continued)

includes a valve for throttling the second gas fraction that is downstream the first heat exchanger.

10 Claims, 2 Drawing Sheets

(52) U.S. Cl.
CPC ........... *F25J 1/0045* (2013.01); *F25J 1/0082* (2013.01); *F25J 1/0201* (2013.01); *F25J 2210/06* (2013.01); *F25J 2230/30* (2013.01); *F25J 2240/40* (2013.01); *F25J 2290/34* (2013.01)

PLANT FOR TREATING GAS, PARTICULARLY NATURAL GAS, SUPPLIED BY A TRANSMISSION NETWORK

TECHNICAL FIELD OF THE INVENTION

The present invention refers to a plant for treating gas, particularly for treating natural gas (typically substantially consisting of methane) supplied by a transmission network, such as a gas pipeline or a methane pipeline, which must be processed before supplying it to the end-users in a gas or liquefied state.

PRIOR ART

Usually, natural gas is transported, at high pressure, along great distances, inside of gas pipelines or methane pipelines (which form the transmission network), then it is distributed by distribution points known as Metering and Regulating Stations, MRS, from which the gas, suitably processed, is delivered to the end-users (households, public facilities, factories, etcetera) through the transmission network. In the MRSs the gas is subjected to a measuring step (by suitable measuring apparatuses) and to a regulation step, in other words its pressure is reduced by a process reducing the gas pressure in the transmission network to a predefined lower pressure, for the distribution network. In the MRS, the gas is further subjected to additional treatments, particularly to a filtration step, a step preheating the gas to a predefined temperature, and to an odorizing step. The preheating step is performed because the pressure drop (typically from 60 bar to 5 bar) cools down the gas and such cooling, if not prevented, can freeze the pipes and also the metering and regulating apparatuses, which in turn determines a supply disruption. The preheating step is performed by burning a gas fraction in a water heating boiler, which in turn is used for preheating the gas. Therefore, the preheating step is an additional expense and also an energy waste.

A further alternative approach of delivering natural gas consists of delivering LNG (liquefied natural gas). In this case, the extracted natural gas is subjected to a liquefying step by consecutive cooling and condensing steps, then it is transported inside tanks typically by land or sea. The liquefied natural gas can then be subjected to regasification before being introduced into the distribution network, or can be used in the liquid state, for example, in the automotive and/or industrial field.

The known liquefying plants (for example the Linde cycle plant or the likes) generally compress the gas, cool it down, and then they decompress it, by exploiting this further pressure drop for ultimately cooling down the gas in order to liquefy it. However, the compression required to enable the liquefying process, is also one of the main costs with reference to the power consumption. Moreover, in this liquefying plants, there is always a waste gas component which is difficult to manage.

BRIEF SUMMARY OF THE INVENTION

Therefore, an object of the present invention consists of making available a plant for treating gas, particularly natural gas, supplied by a transmission network, for supplying, on one side, liquefied gas at a lower pressure, destined for example to the distribution network, and from another side, liquefied gas destined to be used in the automotive and/or industrial fields, enabling to reduce the energy wastes associated to the respective processes according to the beforehand prior art.

This and other objects are obtained by a plant according to claim 1.

Dependent claims define possible advantageous embodiments of the invention.

BRIEF DESCRIPTION OF THE DRAWINGS

In order to better understand the invention and appreciate the advantages, some exemplifying non-limiting embodiments thereof will be described in the following with reference to the attached figures, wherein.

DESCRIPTION OF THE EMBODIMENTS OF THE INVENTION

Figure 1:
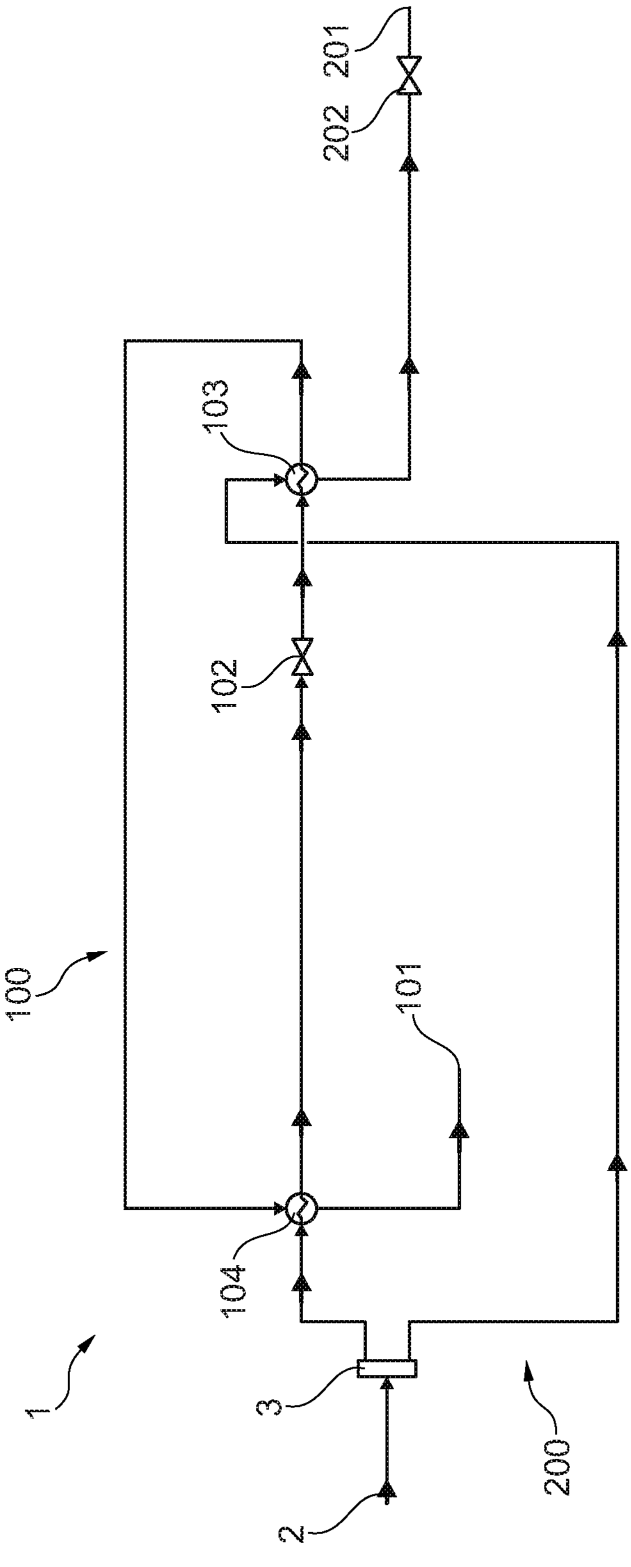
FIG. 1 is a schematic view of a gas treating plant according to a possible embodiment of the invention.

Referring to the attached figures, a plant for treating gas, particularly natural gas (typically comprising methane) is generally indicated by reference 1. The plant 1 receives at the inlet gas supplied by a transmission network (not shown in the figures) and, to this purpose, it comprises an inlet 2 connectable to said transmission network. The natural gas conveyed by the transmission network which enters the plant 1 is at a high pressure, typically between 35 and 75 bar. The plant 1 comprises a first plant portion 100 for decompressing a first fraction of the gas supplied by the transmission network and a first outlet 101 for supplying the decompressed gas at an outlet predefined pressure from the plant 1 itself, particularly to a distribution network (not shown in the figures), which the first outlet 101 is connectable to. The decompressed gas delivered at the first outlet 101 is typically at a pressure of about 5 bar for methane gas, therefore at a pressure lower than the pressure of the transmission network. Moreover, preferably, the gas is supplied at the outlet at an outlet predefined temperature, which can be comprised between 5° C. and 50° C., for example, generally greater than the temperature of the gas in the transmission network.

The plant 1 comprises a second plant portion 200 for liquefying a second fraction of the gas supplied by the transmission network and a second outlet 201 for supplying the liquefied gas, typically LNG, flowing out the plant 1 itself, where the liquefied gas can be stored in tanks in order to be transported away. The liquefied gas supplied at the second outlet 201 is typically at a temperature of about −150° C. and at a pressure comprised between about 4 and 5 bar in case of LNG.

Advantageously, the plant 1 comprises a flow divider 3 for separating the gas entering through the inlet 2 into the first fraction destined to the first plant portion 100 and into the second fraction destined to the second plant portion 200. Preferably, the flow divider 3 is configured so that all the entering gas is delivered to the first 100 and second plant portions 200. Still more preferably, the first gas fraction is greater than the second gas fraction, in order to meet the working flow rate and the requirements of the distribution network.

In the following description and in the attached claims, the positions of the elements in the plant, will be indicated by the terms “upstream” and “downstream”, which should be understood with reference to the direction of the gas flow inside the plant, as shown by the arrows drawn in the attached figures.

With reference to FIG. 1, the first plant portion 100 comprises a throttle valve 102 in which the first gas fraction from the flow divider 3 is subjected to a temperature and pressure reductions by generally remaining in the gas state.

Further, the first plant portion 100 comprises a first heat exchanger 103 establishing a thermal exchange relationship between the segment of the first plant portion 100 placed downstream the throttle valve 102 and the second plant portion 200, wherein the first gas fraction is heated by the second gas fraction flowing in the second plant portion 200, which cools down accordingly.

Moreover, the first plant portion 100 comprises a second heat exchanger 104 establishing a thermal exchange relationship between the segment of the first portion 100 placed downstream the first heat exchanger 103 and the segment of the first plant portion 100 placed upstream the throttle valve 102. In this way, the gas in the first plant portion 100 supplied by the flow divider 3 is pre-cooled by the cooler gas coming from the throttle valve 102 and by the first heat exchanger 103, which in turn is heated. Such gas from the second heat exchanger 104 can be supplied to the first outlet 101 and delivered therefrom to the distribution network.

Referring now to the second plant portion 200, it comprises, as beforehand cited, a first heat exchanger 103, in which the second gas fraction from the flow divider 3 is cooled down and at least partially liquefied. The second plant portion 200, downstream the first exchanger 103, comprises a throttle valve 202 deter-mining a further temperature and pressure reductions of the liquefied gas. The liquefied gas from the throttle valve 202 therefore can be delivered to the second outlet 201, where it can be extracted, stored, and transported in a liquefied state.

As a person skilled in the art will clearly understand, the plant according to the invention substantially reduces the energy wastes present in the systems according to the prior art described in the introductory part. Actually, the first plant portion 100 does not require heating burners and the second plant portion 200 does not need energy for the compression and for other energy-consuming methods used for liquefying. Such effect is obtained by the synergic relationship between the first and second plant portions, which exchange with each other heat by the above described modes.

Figure 2:
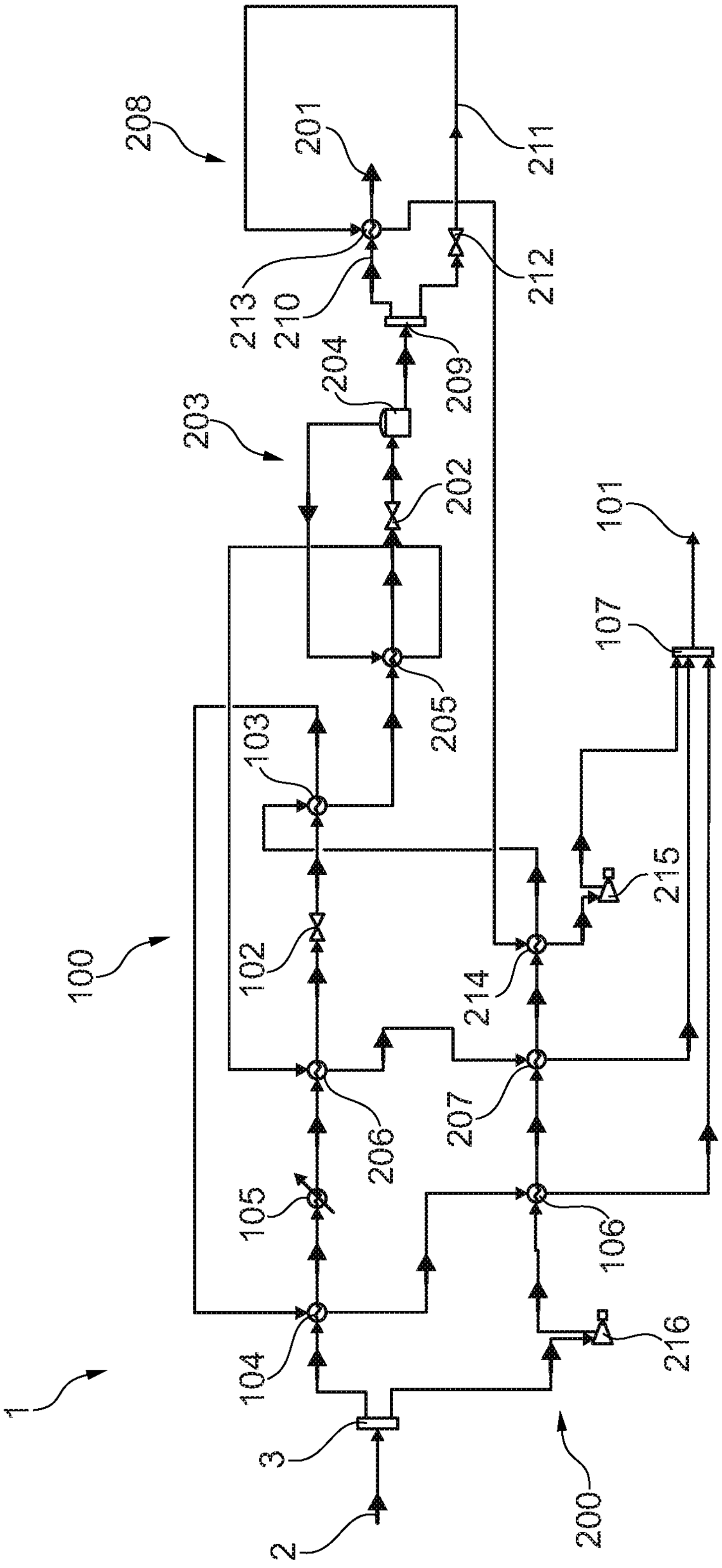
FIG. 2 is a schematic view of a gas treating plant according to a further possible embodiment of the invention.

Referring to FIG. 2, some alternative embodiments of the plant according to the invention will be now described. The plant in FIG. 2 comprises the same elements of the plants of FIG. 1, as well as plural additional elements for a still better efficiency of the processes. It is observed that each of such additional elements can be provided alone or combined with one or more of the further additional elements and that the many alternative embodiments stemming from such combinations are not individually shown only for not making obscure the present description.

Referring to the first plant portion 100, it comprises, downstream the flow divider 3, the throttle valve 102, the first heat exchanger 103, and the second heat exchanger 104, according to what was beforehand described.

According to a possible embodiment, the first plant portion 100 comprises a chiller 105 located upstream the throttle valve 102, preferably downstream the second heat exchanger 104. The chiller 105 further pre-cools the first gas fraction before entering the throttle valve 102.

According to an embodiment, the first plant portion 100 comprises a third heat exchanger 106 placed downstream the second heat exchanger 104 establishing a thermal exchange relationship between the segment of the first plant portion 100 downstream the second heat exchanger 104 and the segment of the second plant portion 200 upstream the first heat exchanger 103. The third heat exchanger 106 determines a further heating of the first gas fraction downstream the second exchanger 104 and a pre-cooling of the second gas fraction upstream the first heat exchanger 103.

According to an embodiment, the second plant portion 200 comprises a section 203 for recirculating a possible non-liquefied part of the second gas fraction exiting the throttle valve 202. Advantageously, such recirculation section 203 comprises a condensate separator 204 downstream the throttle valve 202. Such condensate separator 204 separates the liquefied part and the non-liquefied part of the second gas fraction exiting the throttle valve 202 and conveys the liquefied part to the second outlet 201 and the non-liquefied part to the first outlet 101, where this latter can be mixed in a mixer 107 with the first gas fraction from the second heat exchanger 104. The non-liquefied part, being effectively a waste of the second plant portion 200, can be advantageously recovered.

The non-liquefied part of the second gas fraction from the condensate separator 204, at a low temperature, can be advantageously used for further pre-cooling the second gas fraction in the segment upstream the throttle valve 202. For this matter, the recirculation section 203 can comprise a fourth heat exchanger 205 establishing a thermal exchange relationship between the segment conveying the non-liquefied part of the second gas fraction downstream the condensate separator 204 and the segment of the second plant portion 200 upstream the throttle valve 202, preferably downstream the first heat exchanger 103.

Still more advantageously, the non-liquefied part of the second gas fraction from the condensate separator 204 can be also used for further pre-cooling the first gas fraction in the segment upstream the throttle valve 102. For this purpose, the recirculation section 203 can comprise a fifth heat exchanger 206, preferably placed downstream the fourth heat exchanger 205, if provided, which establishes a thermal exchange relationship between the segment conveying the non-liquefied part of the second gas fraction downstream the condensate separator 204 and the segment of the first plant portion 100 upstream the throttle valve 102, preferably downstream the chiller 105, if provided.

Still more advantageously, the non-liquefied part of the second gas fraction from the condensate separator 204 can be also used for further pre-cooling the second gas fraction in the segment upstream the throttle valve 202. For this purpose, the recirculation section 203 can comprise a sixth heat exchanger 207, for example placed downstream the third heat exchanger 106 and upstream the first heat exchanger 103, which establishes a thermal exchange relationship between the segment of the second plant portion 200 which conveys the non-liquefied part of the second gas fraction downstream the condensate separator 204 and the segment of the second plant portion 200 upstream the first heat exchanger 103.

According to an embodiment, the second plant portion 200 comprises a second recirculation section 208 placed downstream the throttle valve 202, preferably downstream the recirculation section 203, if provided. The second recirculation section 208 comprises a second flow divider 209 separating the liquefied part of the second gas fraction into two distinct branches 210 and 211. The first branch 210 leads to the second outlet 201, while the second branch leads to the mixer 107 and from there to the first outlet 101. The second branch 211 comprises a second throttle valve 212, which subjects the liquid gas to a further throttling action, in which the liquid gas is subjected to further temperature and pressure reductions, and a seventh heat exchanger 213 which establishes a thermal exchange relationship between the first branch 210 and the segment of the second branch 211 downstream the second throttle valve 212, so that the liquefied gas circulating in the first branch 210 is further cooled down before flowing to the second outlet 201, while the liquefied gas downstream the second throttle valve 212 in the second segment 211 switches back to the gas state before flowing to the mixer 107 and then being conveyed to the first outlet 101. Thus, also this latter gas fraction, which is effectively a waste of the second plant portion 200, can be advantageously recovered.

According to a further embodiment, the second section 211 comprises an eighth heat exchanger 214 establishing a thermal exchange relationship between the second segment 211 (and preferably the portion of the second segment 211 downstream the seventh heat exchanger 213) and the segment of the second plant portion 200 upstream the first heat exchanger 103, preferably downstream the sixth heat exchanger 207. This further pre-cools the second gas fraction upstream the throttle valve 202, and also heats the part of the second gas fraction flowing in the second segment 211 before it reaches the mixer 107 and from there the first outlet 101. According to a possible embodiment, the second segment 211 comprises, downstream the seventh heat exchanger 213, preferably downstream the eighth heat exchanger 214, if provided, a first compressor 215 suitable to increase the pressure, and also the temperature, of the gas flowing in the second segment 211 before reaching the mixer 107 and from there the first outlet 101.

According to an embodiment, the second plant portion 200 comprises a second compressor 216 placed upstream the first heat exchanger 103, and preferably upstream the third heat exchanger 103, if provided.

From the above given description, a person skilled in the art can appreciate that the plant according to the invention reduces the wastes described with reference to the plants according to the prior art due to an energy synergy between the first and the second plant portions. Indeed, the pressure difference of the process which is performed in the first plant portion is what is required by the process performed in the second plant portion, and the heat difference of the process performed in the second plant portion is what is required by the process performed in the first plant portion. Substantially, by combining the two processes, one process compensates the other one by eliminating the negative drawbacks which each process would have if not combined together.

According to the invention, it is not necessary to counter the cooling of the gas in the first plant portion by preheating it by external boilers because the decompressed gas is recirculated, causing the gas to liquefy in the second plant portion, and at the same time the gas is suitably heated in order to be conveyed into the local distribution network.

The person skilled in the art, in order to meet specific contingent needs, can introduce many additions, modifications, or substitutions of elements with other operatively equivalent ones to the described embodiments of the plant for treating gas, particularly natural gas, without falling out of the scope of the attached claims.

The invention claimed is:

1. A plant for treating gas, particularly natural gas, supplied by a transmission network, comprising:
- a gas inlet connectable to said transmission network;
- a first plant portion configured to decompress to a predefined outlet pressure a first fraction of the gas from the inlet and to supply the decompressed gas at a first outlet;
- a second plant portion configured to liquefy a second fraction of the gas from the inlet and to supply the liquefied gas at a second outlet, wherein the first plant portion comprises:
- a valve for throttling the first gas fraction;
- a first heat exchanger establishing a thermal exchange relationship between the segment of the first plant portion placed downstream the throttle valve and the second plant portion;
- a second heat exchanger establishing a thermal exchange relationship between the segment of the first plant portion placed downstream the first heat exchanger and the segment of the first plant portion placed upstream the throttle valve, and wherein the second plant portion comprises:
- a valve for throttling the second gas fraction downstream the first heat exchanger;
- a section for recirculating a non-liquefied part of the second gas fraction exiting the throttle valve, said recirculation section comprising a condensate separator configured to separate a liquefied part and a non-liquefied part of the second gas fraction exiting the throttle valve of the second plant portion and to convey the liquefied part to the second outlet and the non-liquefied part to the first outlet, wherein said recirculation section comprises another heat exchanger establishing a thermal exchange relationship between the segment transporting the non-liquefied part of the second gas fraction downstream the condensate separator and the segment of the first plant portion upstream the throttle valve of the first plant portion.

2. The plant according to claim 1, wherein the first plant portion comprises a chiller placed upstream the throttle valve of the first plant portion.

3. The plant according to claim 1, wherein the first plant portion comprises a third heat exchanger placed downstream the second heat exchanger establishing a thermal exchange relationship between the segment of the first plant portion downstream the second heat exchanger and the segment of the second plant portion upstream the first heat exchanger.

4. The plant according to claim 1, wherein said recirculation section further comprises a fourth heat exchanger establishing a thermal exchange relationship between the segment transporting the non-liquefied part of the second gas fraction downstream the condensate separator and the segment of the second plant portion upstream the throttle valve of the second plant portion.

5. The plant according to claim 1, wherein said recirculation section comprises a sixth heat exchanger establishing a thermal exchange relationship between the segment transporting the non-liquefied part of the second gas fraction downstream the condensate separator and the segment of the second plant portion upstream the first heat exchanger.

6. The plant according to claim 1, wherein the second plant portion comprises a second recirculation section placed downstream the throttle valve of the second plant portion wherein said second recirculation section comprises a first branch for conveying a liquefied part of the second gas fraction from the throttle valve of the second plant portion to the second outlet, and a second branch connected to the first outlet, wherein the second branch comprises a second throttle valve and a seventh heat exchanger establishing a thermal exchange relationship between the first branch and the segment of the second branch downstream the second throttle valve of the second plant portion.

7. The plant according to claim 6, wherein the second branch comprises an eighth heat exchanger establishing a thermal exchange relationship between the portion of the second branch downstream the seventh heat exchanger and the segment of the second plant portion upstream the first heat exchanger.

8. The plant according to claim 6, wherein the second segment comprises a first compressor downstream the seventh heat exchanger.

9. The plant according to claim 1, wherein the second plant portion comprises a second compressor placed upstream the first heat exchanger.

10. The plant according to claim 1, wherein in the segment between the first heat exchanger and the second heat exchanger the first plant portion is fluidically separated from the second plant portion.

* * * * *